UNITED STATES PATENT OFFICE.

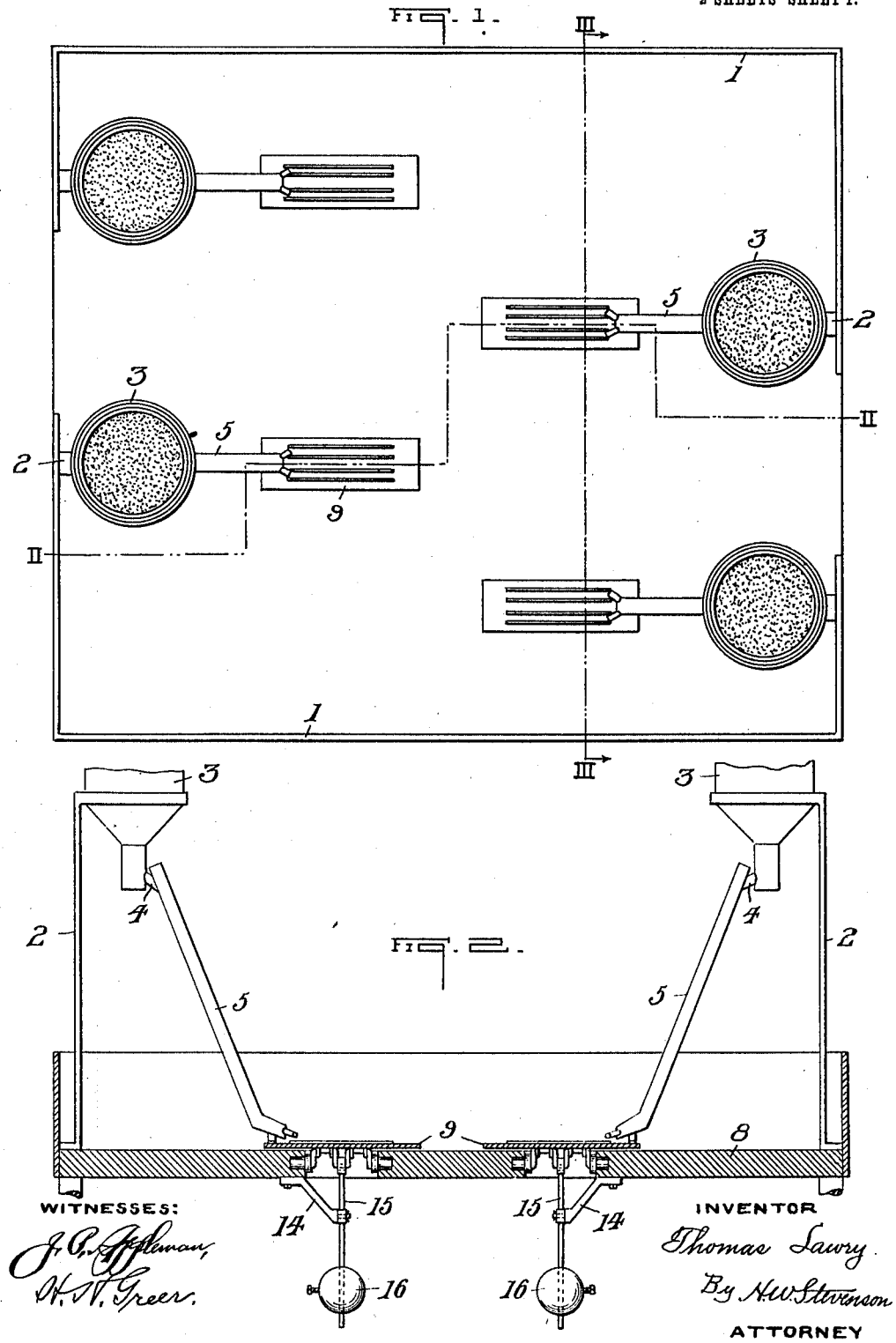

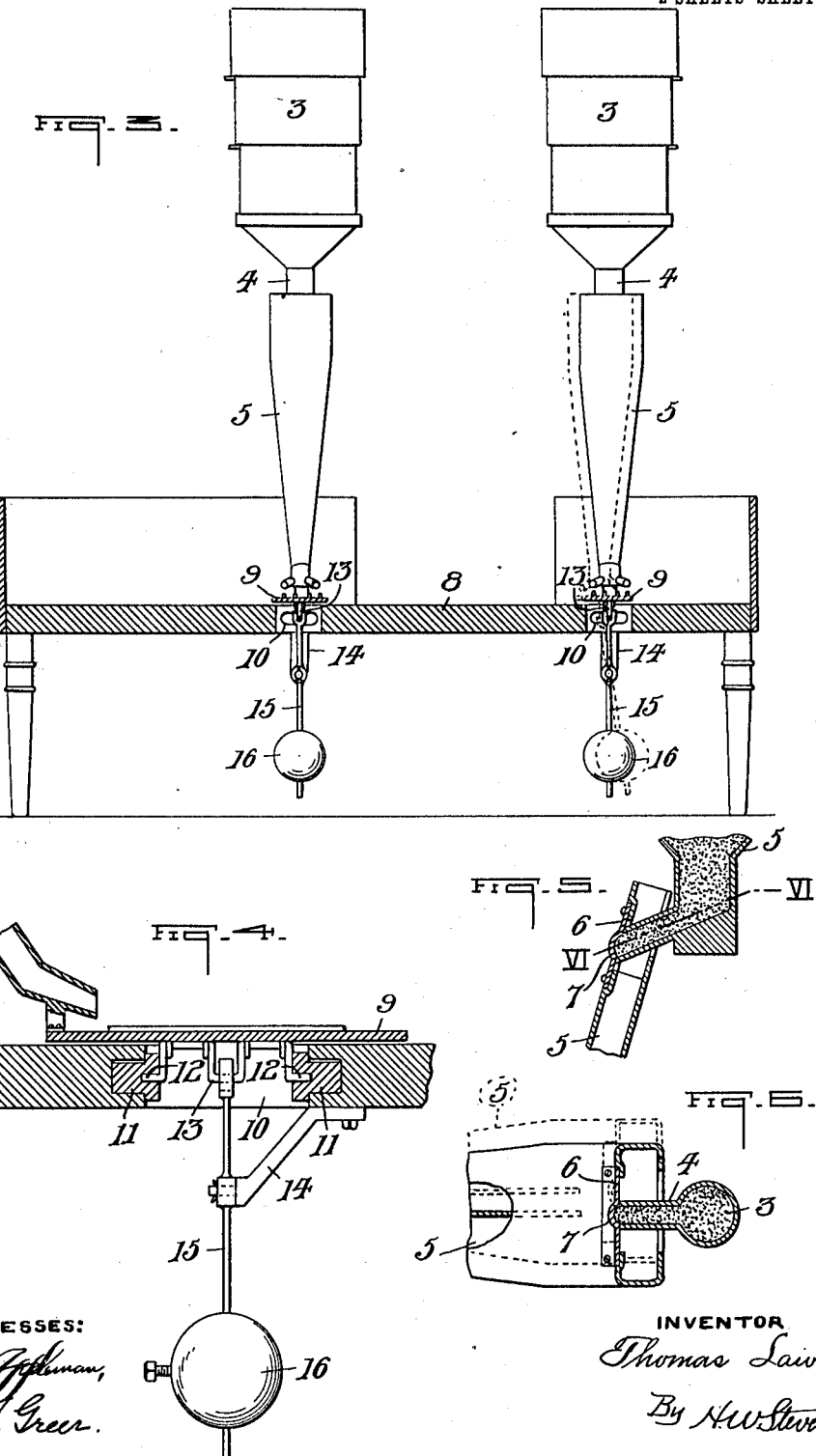

THOMAS LAWRY, OF RANKIN, PENNSYLVANIA.

POULTRY FEEDER AND EXERCISER.

1,003,760.  Specification of Letters Patent. Patented Sept. 19, 1911.

Application filed October 5, 1909. Serial No. 521,111.

*To all whom it may concern:*

Be it known that I, THOMAS LAWRY, a citizen of the United States, residing at Rankin, in the county of Allegheny and State of Pennsylvania, have invented certain new and useful Improvements in Poultry Feeders and Exercisers, of which the following is a specification.

My invention pertains to certain new and useful improvements in poultry feeders and exercisers, being intended primarily as a means for presenting only a limited portion of feed at a time, and depending entirely on the amount of scratching done by the fowl. In addition to the automatic feeding feature of my invention the device will also afford a means for compelling the fowl to work for its food, thus embodying an exercising function that will materially benefit the health and egg producing tendencies of the female birds.

Having in view the above objects my invention consists in the novel construction and arrangement of parts shown in the accompanying drawings, in two sheets, which illustrate one embodiment of my idea. I do not limit myself to the exact form of detail construction, so illustrated, but reserve the right to make necessary alterations and amendments therein which will however conform in all particulars to the original idea involved.

Referring to the drawings: Figure 1 is a plan view showing a plurality of feeders arranged in an inclosure. Fig. 2 is a vertical section taken on line 2—2 of Fig. 1. Fig. 3 is a similar view taken on line 3—3 Fig. 1. Fig. 4 is an enlarged detail in section of the operating mechanism. Fig. 5 is a similar view of a valve mechanism, and Fig. 6 a cross section taken on line 6—6 of Fig. 5.

Throughout the several views the numeral 1 designates a suitable box or frame work arrangement which is preferably elevated off the floor of the poultry house. Suitably supported by brackets or other suspension means 2, are the hoppers 3, which may be arranged as shown, or positioned in any other adequate and convenient manner to suit the needs and capacity of the device. These hoppers are preferably made in a telescoping formation, as shown in Fig. 3, in order to provide for variable capacities, or they may be constructed in solid formation if desired.

The lower or discharge end of the hopper is provided with a spout 4 of greatly reduced capacity, said spout entering the top portion of a conductor or boot-leg member 5. Suitably secured in the upper part of said member 5, in close proximity to the mouth of the spout 4, is a plate 6, provided with a concavity or pocket 7 of preconceived size and capacity, which is normally in engagement over the discharge end of the said spout 4. This said member 6, which is preferably made removable, is likewise provided with flat surfaces at each side of the concavity 7 the same acting to shut off any escapement of the contents of the hopper when brought into position over the end of the spout 4; the operation of which will be more particularly described farther on.

The conductor extends approximately to the floor of the box 1 where it is securely fastened to a movable tread or board 9. If found expedient the said conductor 5 may be partitioned off, and the lower or discharge end provided with flaring exits, as shown in Fig. 1, for a purpose to be hereinafter more explicitly set forth.

The floor 8 is provided with suitable slots or apertures 10, and over each slot is positioned the tread 9, the upper surface of which carries a plurality of slats, or should the said tread be made of metal, then integral corrugations instead of the slats would be utilized.

The edges of the flooring adjacent each slot are grooved for the reception, and travel therein, of suitably constructed casters or non-friction rollers 11, an axle 12 being provided for said rollers, the same forming an integral part with a stirrup 13, secured by suitable means to the under side of the tread 9. Said tread will be elevated slightly above the flooring and the weight thereof, including the carried conductor 5, resting on the said rollers 11. A bracket 14, or other suitable suspension means, is secured to the under side of the flooring, the outer end of which is rounded off and acts as a bearing and pivotal point for a vertically disposed rod or pendulum 15, the upper end thereof being bifurcated, and engaging around the said stirrup 13, the lower end being provided with an adjustable weight 16.

In actual practice, the respective parts being assembled as shown and described, it is first necessary to fill the hopper or hoppers with any suitable feed, when, with the aid of the fowl, the operation will be as follows:—The natural inclination and tendency of fowls is to scratch for their food, and taking into consideration this fact I would first distribute a small portion of feed on the tread 9 where it would lodge between the slats or corrugations, and necessitate a certain amount of scratching on the part of the fowl before it could acquire the grain. This scratching operation will cause a forward or backward movement of the tread 9 sufficient to carry the conductor 5 into such a position as to uncover the mouth of the spout 4, it being understood that when said tread is at rest the normal tendency of the conductor is to center itself in such a manner that the concavity or pocket 7 will register with the mouth of the said spout 4. The instant any movement of the tread is effected the conductor moves in unison therewith, and in so doing draws the pocket 7 away from its normal seat, and in lieu of said pocket, presents a flat surface against the mouth of the spout, completely covering that orifice, and temporarily preventing any further egress of the contents of the hopper. Only the quantity of grain that has lodged in the pocket, and been carried to either side of the spout, will fall into the conductor 5, be carried thereby to the tread 9, onto which it will be emitted, and be taken up by the fowl. The use of the partition lengthwise of the conductor, and reaching approximately to the lower edge of the pocket 7, also the flared lower extremity of said conductor, are not essential to the successful operation of my device, but will be of utility in directing the course of the feed as it falls out of said pocket, and distributing it at the proper place on the said tread; the main object being to have the feed arrive in front of the fowl. During the forward movement of the tread 9, due to the scratching action of the fowl, the stirrup 13, which is a fixed part of said tread, and moves in unison therewith, will draw the weighted pendulum from its normal perpendicular attitude to a more or less angled position; as shown by dotted lines, Fig. 3. The instant the fowl ceases its scratching action, or the drawing movement on the tread is released, the weighted pendulum will automatically assume its normal position, thus forcing the said tread back to its normal seat, at the same time moving the conductor 5 to its former position, thereby bringing the pocket 7 into register with the mouth of the spout 4, when said pocket will again receive a limited portion of feed from the hopper ready for the next succeeding discharge movement. This foregoing described reciprocating movement of the tread and conductor continues so long as the fowl keeps up its scratching action, and only the amount of feed regulated by the capacity of the pocket 7 will be presented each time the tread is operated.

The raising and lowering of the weight member 16, to different heights on the rod 15, affords a simple and adequate means for regulating the sensitiveness and action of the said tread member. The lower said weight is adjusted on the rod the stiffer will be the action of said tread when being operated by the fowl, and likewise the nearer said weight is to the tread the more sensitive the action thereof. This arrangement will provide for fowls of variable weight, strength, and breed.

In providing the removable valve member 6 a means is afforded for presenting pre-determined quantities of feed to the fowl, as a plurality of such plates can accompany each machine, each one provided with a pocket of different capacity.

What I claim, and desire to secure by Letters Patent, is:—

1. In a device of the character described a suitable hopper; a spout projecting from said hopper; a movable chute member, the upper end of which receives said spout and has lateral movement thereover; a pocket formed in the wall of said chute and normally in engagement over the mouth of said spout; and a movable tread below the hopper to which is secured the lower extremity of the said chute.

2. In a device of the character described a suitable hopper; a spout projecting from said hopper; a movable chute member, the upper portion of which receives said spout and has lateral movement thereover; a pocket formed in the wall of said chute designed to receive a portion of the hopper's contents and normally in engagement over the mouth of said spout; and means consisting of a movable tread positioned below the hopper, and to be operated by the fowl, to which is secured the lower end of said chute, whereby the contents of said pocket is permitted to fall by way of the chute onto the thread.

3. In a device of the character described a suitable hopper; a spout projecting from said hopper; a movable chute member, the upper end of which receives said spout and has reciprocal movement thereover; a pocket carried by said chute and normally in engagement with the mouth of said spout; and a movable tread below the hopper to which is secured the lower extremity of the said chute.

4. In a device of the character described a suitable hopper; a spout projecting from said hopper; a movable chute member, the upper portion of which receives said spout and has reciprocal movement thereover; a pocket carried by said chute and normally in engagement over the mouth of said spout; a movable tread below the hopper, to be operated by the fowl, to which is secured the lower extremity of said chute; and a centralizing weight member carried by the tread.

In testimony whereof I affix my signature in presence of two witnesses.

THOMAS LAWRY.

Witnesses:
BEATRICE FITZGERALD,
J. P. APPLEMAN.

Copies of this patent may be obtained for five cents each, by addressing the "Commissioner of Patents, Washington, D. C."